(12) United States Patent
Iellimo et al.

(10) Patent No.: US 12,227,214 B2
(45) Date of Patent: Feb. 18, 2025

(54) CART ASSEMBLY SYSTEM

(71) Applicant: FRAZIER INDUSTRIAL COMPANY, Long Valley, NJ (US)

(72) Inventors: Domenick Iellimo, Forked River, NJ (US); Mark Boehnke, Waterloo, NY (US)

(73) Assignee: FRAZIER INDUSTRIAL COMPANY, Long Valley, NJ (US)

( * ) Notice: Subject to any disclaimer, the term of this patent is extended or adjusted under 35 U.S.C. 154(b) by 761 days.

(21) Appl. No.: 17/337,573

(22) Filed: Jun. 3, 2021

(65) Prior Publication Data
US 2022/0388558 A1    Dec. 8, 2022

(51) Int. Cl.
*B62B 3/02*    (2006.01)

(52) U.S. Cl.
CPC ............ *B62B 3/02* (2013.01); *B62B 2202/10* (2013.01); *B62B 2205/006* (2013.01); *B62B 2501/06* (2013.01)

(58) Field of Classification Search
None
See application file for complete search history.

(56) References Cited

U.S. PATENT DOCUMENTS

| | | | |
|---|---|---|---|
| 2,961,250 A * | 11/1960 | Beach | B62B 3/10 280/35 |
| 3,331,613 A * | 7/1967 | Popelka | B62B 5/0083 403/388 |
| 4,700,959 A * | 10/1987 | Lars | B62B 3/00 52/657 |
| 4,773,546 A | 9/1988 | Konstant | |
| 5,299,817 A * | 4/1994 | Chang | B62B 5/0083 280/35 |
| 5,328,038 A * | 7/1994 | Allen | B65G 1/06 211/151 |
| 5,419,444 A * | 5/1995 | Strom | B65G 1/026 211/151 |
| 5,599,031 A * | 2/1997 | Hodges | B62B 5/0083 280/35 |
| 6,068,141 A * | 5/2000 | Mulholland | B65G 1/026 211/151 |
| 6,095,533 A * | 8/2000 | Balolia | B60T 1/14 188/19 |
| 6,109,625 A * | 8/2000 | Hewitt | F16M 11/18 280/43.24 |
| 6,158,943 A * | 12/2000 | Sullivan | B65G 1/026 211/151 |

(Continued)

*Primary Examiner* — Katy M Ebner
(74) *Attorney, Agent, or Firm* — Dilworth & Barrese, LLP

(57) ABSTRACT

A cart for supporting pallets weighing over 2000 lbs and even over 3000 pounds and transporting those pallets on rails is provided. The carts are formed by releasably attaching a minimal number of pieces, such as by bolting the parts together. By making the parts substantially identical and making the parts as symmetric mirror images, a single part can have multiple uses, such as on both the left and right sides or both the front and back. For example, a rear cross beam can have the same dimensions as a middle cross beam and/or a front cross beam. A left side beam can be identical to a right side beam. A right side bracket for connecting beams and/or mounting wheels can be identical to a left side bracket and a front bracket can be identical to a rear bracket.

21 Claims, 11 Drawing Sheets

(56) References Cited

U.S. PATENT DOCUMENTS

| | | | | |
|---|---|---|---|---|
| 6,851,562 | B2* | 2/2005 | Gorniak | B65G 1/026 |
| | | | | 211/151 |
| 7,059,617 | B1* | 6/2006 | Verna | B62B 5/0083 |
| | | | | 280/79.3 |
| 7,090,187 | B2* | 8/2006 | Tusavitz | A47F 5/10 |
| | | | | 248/346.06 |
| 7,530,581 | B1* | 5/2009 | Squires, Sr. | F16M 3/00 |
| | | | | 280/47.35 |
| D600,873 | S * | 9/2009 | Banasik | D34/23 |
| 8,672,148 | B2* | 3/2014 | Krummell | B65G 1/026 |
| | | | | 211/151 |
| 9,010,798 | B2* | 4/2015 | Buttazzoni | B62B 3/00 |
| | | | | 280/638 |
| 9,694,838 | B2* | 7/2017 | Gullino | B62B 3/02 |
| 10,357,104 | B2* | 7/2019 | Jost | H05K 7/1488 |
| 10,710,801 | B1* | 7/2020 | Iellimo | B65G 1/06 |
| 11,968,798 | B2* | 4/2024 | Shurhay | B60B 33/0023 |
| 2005/0082246 | A1* | 4/2005 | Krummell | B65G 1/026 |
| | | | | 211/151 |
| 2007/0029747 | A1* | 2/2007 | Islo | B60F 3/0069 |
| | | | | 280/47.35 |
| 2007/0228681 | A1* | 10/2007 | Schenker | B62B 5/0083 |
| | | | | 280/79.11 |
| 2008/0111332 | A1* | 5/2008 | Nabata | B65D 19/42 |
| | | | | 180/19.1 |
| 2009/0178821 | A1* | 7/2009 | Zavidniak | H05K 7/183 |
| | | | | 174/51 |

* cited by examiner

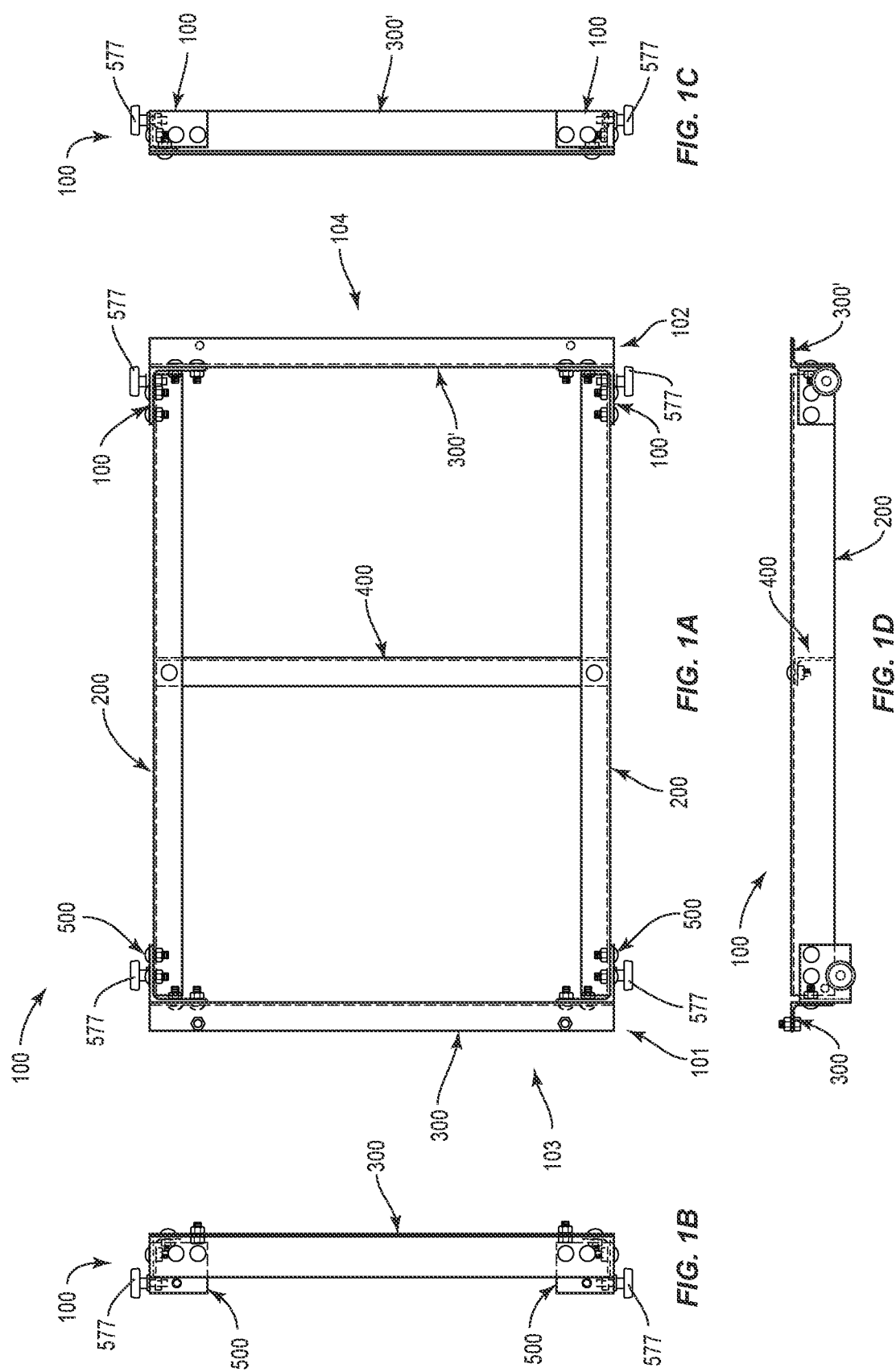

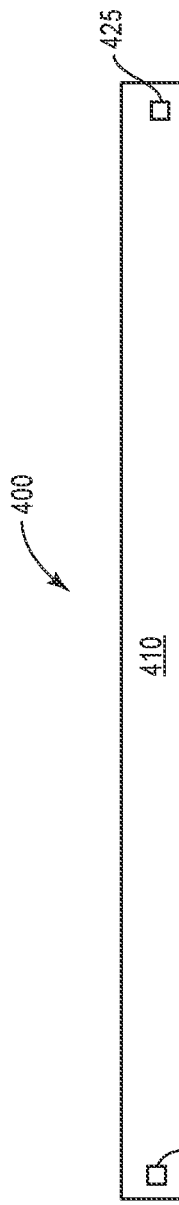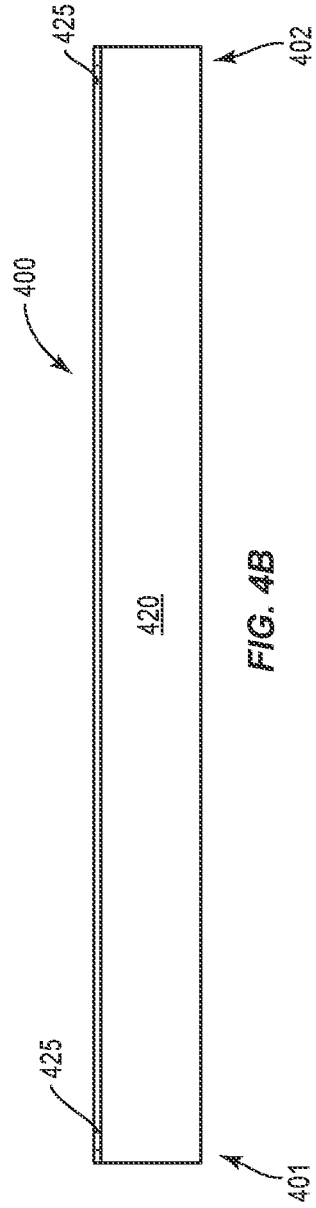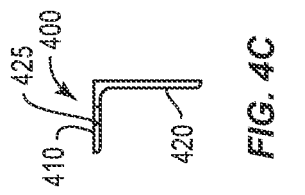

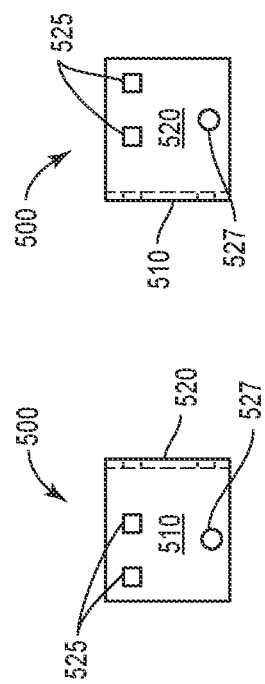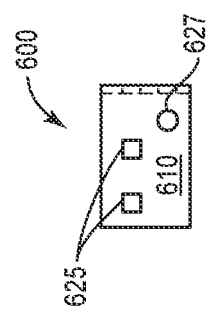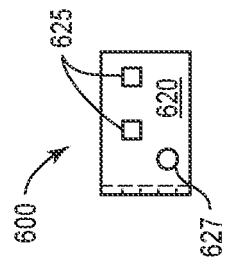

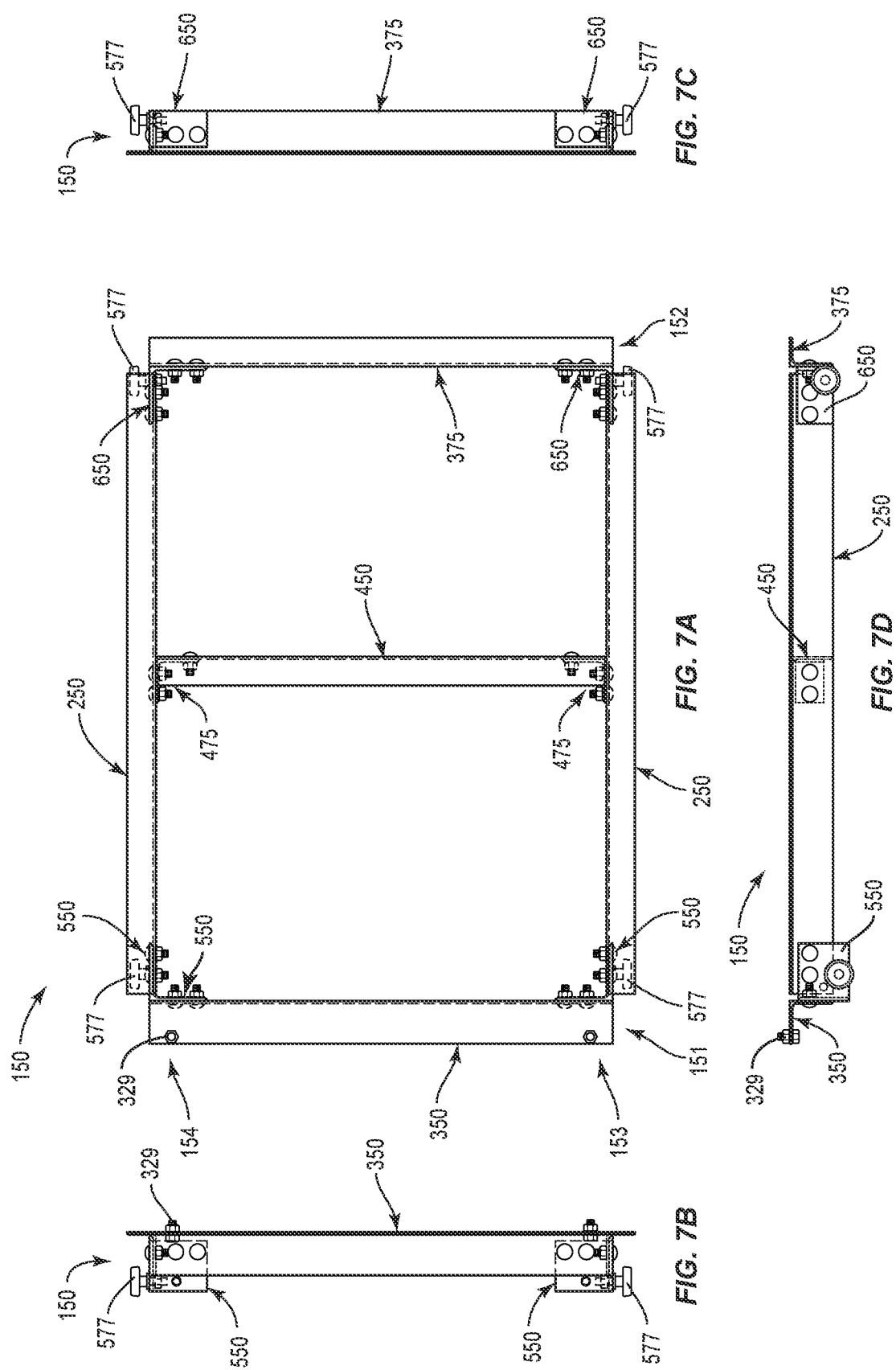

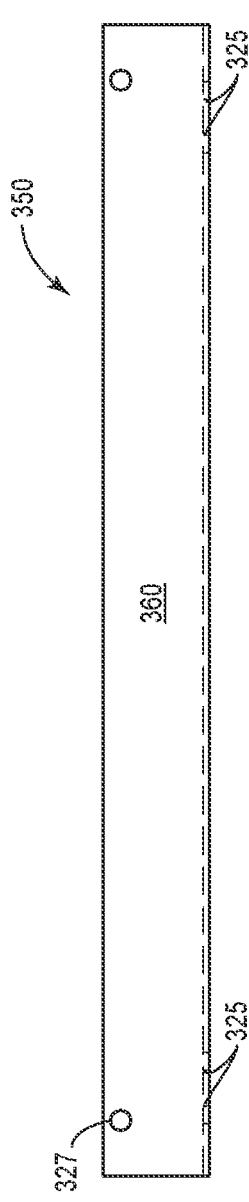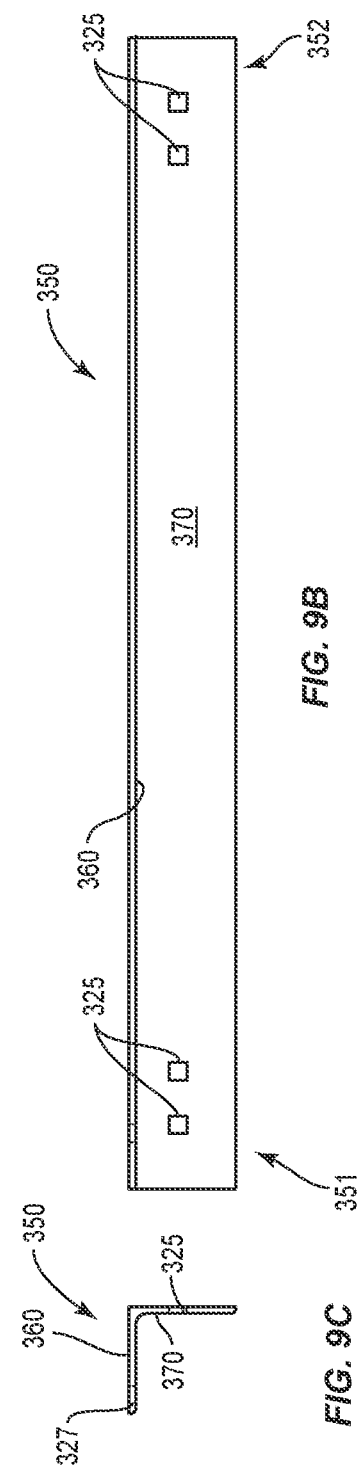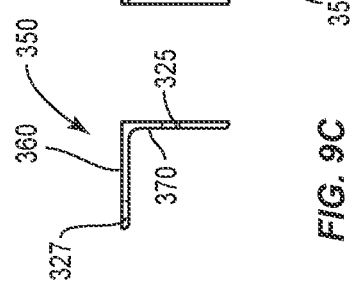

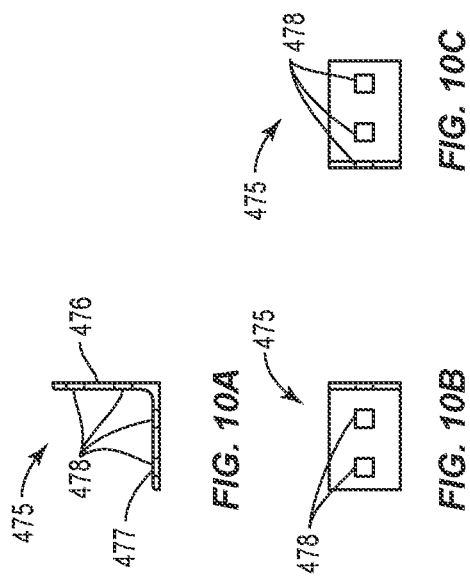
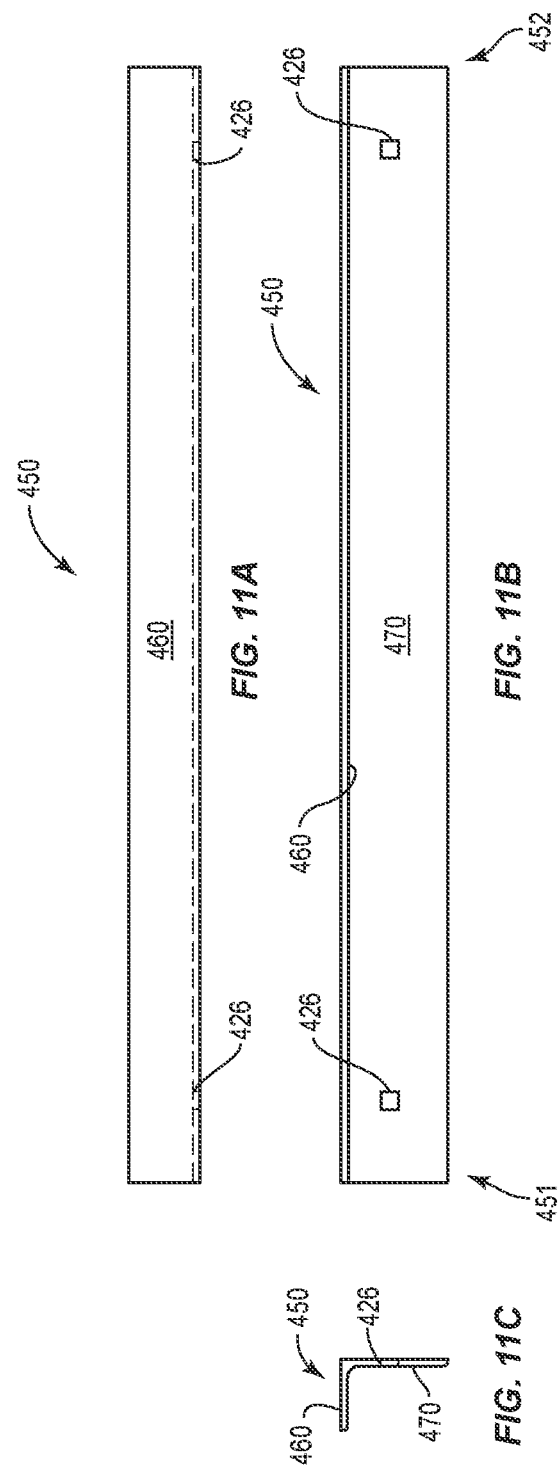

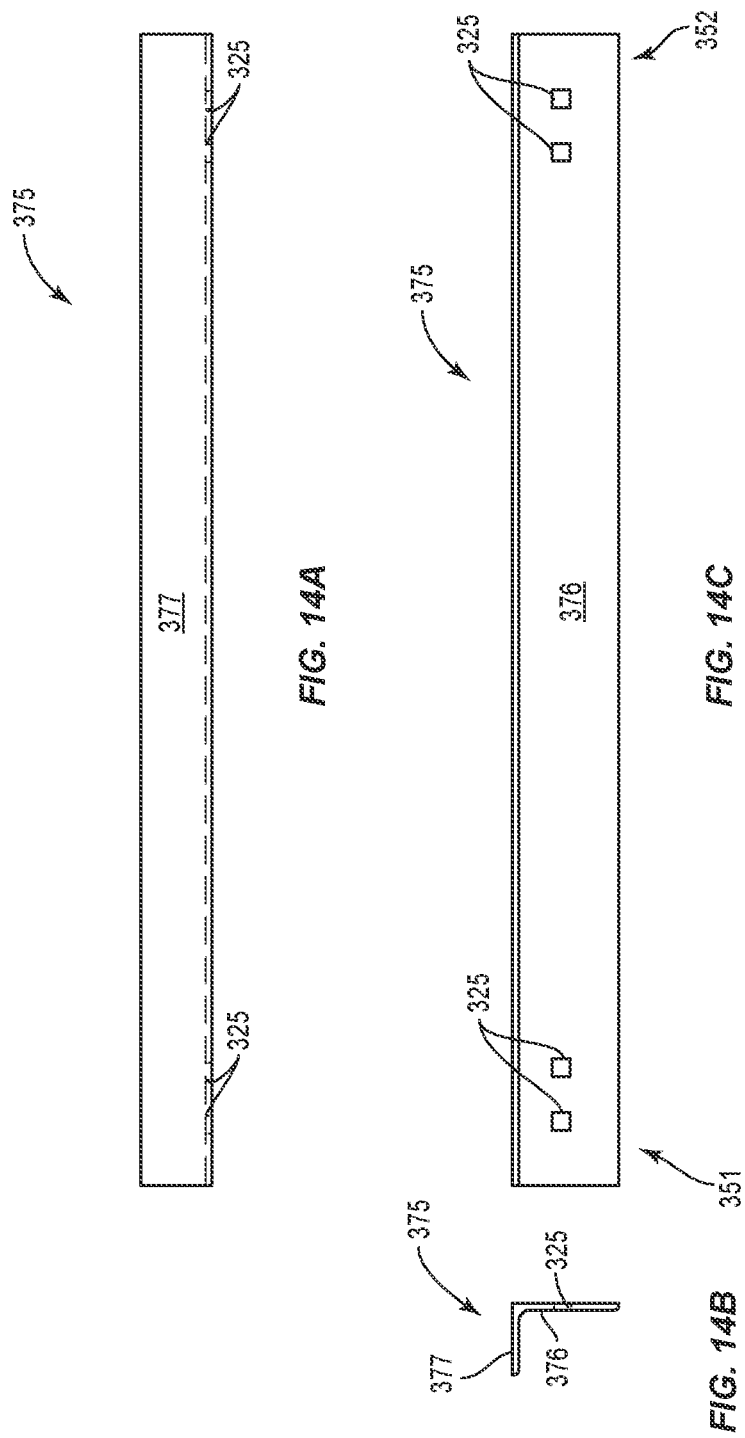

CART ASSEMBLY SYSTEM

BACKGROUND

The invention relates generally to carts used to transport pallets loaded with goods and more particularly to such carts used in storage rack systems for articles loaded onto the type of pallets that are typically adapted to be handled by fork lift trucks. For example, in storage rack systems of the pushback type, a storage bay includes rails and one or more carts ride on those rails. A pallet of goods is loaded on a cart and a second pallet of goods is used to push the first pallet on the cart from the front of the storage bay towards the rear of the bay, to make room for the second pallet of goods. The rails are often inclined upward from front to rear, to urge the carts to roll forward towards the front of the bay, unless actively being pushed or held back towards the rear of the bay.

Storage systems are used in warehouses, department stores, cold storage areas and other storage facilities to store pallets loaded with different goods. Certain storage systems employ extensive multi-story storage rack systems, often called deep rack or high-density storage systems, to store large amounts of a variety of different products. Four, five or more bays can be stacked vertically over each other.

Rack systems are typically formed with vertical columns, which support horizontal rails running lengthwise from the front of a bay to the rear of each bay. The horizontal rails can have the structure of an I-beam, having a lower horizontal wall, a vertical wall extending up from the centerline of the lower wall to creat left and right flanges, and an upper horizontal wall at the top of the vertical wall. The rails are typically parallel. The portion of the upper or lower horizontal wall that faces the corresponding rail of a storage bay row can be referred to as the inner horizontal wall and the portion of the horizontal wall that face away from the corresponding rail can be referred to as the outer horizontal wall. The wheels of the carts that support the pallets can ride on the upper surface of the inner or outer lower horizontal wall flanges of the horizontal rails.

Carts for supporting pallets commonly have a rectangular upper support portion on which the pallet rests and four legs extending downward from the front and rear corners of the support portion. The lower ends of the legs each support a wheel. If a wheel faces outward, it should ride on the inside flange of the lower horizontal wall, inside of the vertical wall. If the wheel faces inward from the leg, it should ride on the outer flange of the lower horizontal wall, outside of the vertical wall. The distance between the upper surface of the support portion of the cart and the wheel determines the height the cart rides above the horizontal rail. Therefore, the rear legs can be shorter than the front legs to keep the top surface of the cart horizontal, even if the rails are inclined.

Conventional carts are made by welding side pieces, which run from front to rear, to cross pieces, which run from side to side. Legs are typically welded to the corners. The legs are typically constructed to receive wheels, which are generally constructed with integral axles.

Due to their nature, the carts tend to require substantial storage space when not in use. Also, if a part of a cart is damaged, it is difficult to replace the damaged part. This makes it difficult to maintain desirable inventories of carts and makes addressing damaged carts a costly and time-consuming endeavor. Also, a cart cannot be conveniently switched between an inclined rail and a horizontal rail, due to the height of the legs.

These and other shortcomings have persisted for many years without satisfactory solution. Accordingly, a more satisfactory structure, system and method are needed to overcome drawbacks and deficiencies in the prior art.

SUMMARY

Generally speaking, in accordance with the invention, a cart for supporting pallets weighing over 2000 pounds, 2500 pounds and even over 3000 pounds and transporting those pallets on rails is provided. The carts are formed by providing a minimal number of pieces and releasably attaching the parts, such as by bolting the parts together. Preferably, a single part can have multiple uses. For example, a rear cross beam can have the same dimensions as a middle cross beam and/or a front cross beam. A left side beam can be identical to a right side beam. A right side corner bracket (for connecting beams and/or mounting wheels) can be identical to a left side bracket and a front bracket can be identical to a rear bracket.

Carts in accordance with the invention can be constructed with as few as two different beams (two identical side beams and two or three identical cross beams) with one or two types of brackets that connect the beams and/or support wheels. In another embodiment of the invention, the rear beam and front beams have different dimensions. In another embodiment of the invention, the middle cross beam has different dimensions than the front and/or rear cross beam. The rear brackets can be different than the front brackets and optionally, middle brackets can be included to attach the middle cross beam to the side beams. The different parts are designed to be bolted together and to be symmetrical for either a left side or a right side use.

The front beam and rear beam can have an "L" shaped cross section with the shape of an angle bracket, with a top horizontal flange and a vertical wall, connected at a vertex. The top flange can extend outward from the cart or inward into the cart. Extending the top flange in the forward direction out from the front of the cart can permit the cart to roll more flush with the front of the bay, if the top flange is high enough to clear the stop at the front of the bay. By using different brackets on the front and rear of the cart, the front brackets can be taller to provide greater height distance between the wheels and the top surface of the cart, so that the top surface can be flat when the guide rails are pitched upwards, towards the rear of the storage bay. The side beams can have the shape of an angle bracket, with a top horizontal flange perpendicular to a vertical wall. The top flange can extend out from the sides of cart or in towards the middle of the cart. If the top flanges extend inward, they can provide a surface to bolt the top of the middle cross beam directly to the top flange of the side beams and/or to bolt any of the cross beams to the side beams. If they extend outward, they can cover the wheels. In that case, a bracket can be used to bolt the middle cross beam to the side beams.

Carts for supporting pallets in accordance with the invention include a pallet supporting portion with an upper surface, which can have the general size and shape of a rectangular pallet. The carts can have left-side beams and right-side beams extending from front cross beams to rear cross beams. As used herein, the forward or front direction will be the direction from the rear of the cart to the front of the cart.

The left-side and right-side beams can be identical and can be shaped like angle brackets with a horizontal top flange perpendicular to a vertical wall. The carts can have cross beams extending from the left side to the right side at the front, rear and mid-point. The cross beams can be identical. Optionally, the middle cross beam can differ from the front and rear cross beam. In one embodiment of the invention, the front and rear cross beams can have different dimensions. For example, the top flange of the front cross beam can extend in the forward direction a longer distance than the top flange of the rear cross beam extends in the rear direction. Each of these parts is preferably bolted together or can be otherwise releasably attached.

The carts can have four corner attachment clips as combined attachment brackets and wheel axle mounting receptacles at each corner, where a side beam meets a front or rear cross beam. The corner members can help bolt the cart together and/or can support the cart wheels. In one embodiment of the invention, a forward portion of the front brackets is mounted between the side beams and the front cross beam, and a rear portion of the rear brackets is mounted between the side beams and the rear cross beam; and a side portion of the corner brackets is mounted outside the side beams.

All four corner members can be identical or the front corner members can be taller than the rear corner members to provide greater height over the axle, so that the cart can have a horizontal supporting top surface, even when the rails on which it rides are pitched. The legs can be positioned so that a wheel rides on an inner flange or an outer flange of the lower wall. Inwardly facing wheels can ride on the outer flange and the respective leg can be attached on the outside of the side beams and positioned outside the rail. Outwardly facing wheels can ride on the inner flange of the rail and the respective leg can be attached inside the side beams and positioned inside the rail.

Carts (plus wheels) in accordance with the invention can be formed with only three, four, or five distinct parts that can be bolted together: a side beam, a cross beam and a corner member. Optionally, the middle cross beam can differ from the front and rear cross beams. Also, the front cross beam can have different dimensions from the rear cross beam. The corner members can all be identical, or the front corner members can have different dimensions than the rear corner members. An additional bracket can be used to bolt the middle cross beam to the side beams. In this manner, cart inventory can be stored conveniently and only a minimal number of parts need to be kept on hand. This makes replacing damaged parts convenient.

Other objects, advantages and embodiments of the invention will be apparent from the specification and the drawings and the scope of the invention will be indicated in the claims.

BRIEF DESCRIPTION OF THE DRAWINGS

For a fuller understanding of the invention, reference is had to the following description, taken in connection with the accompanying drawings, in which:

FIG. 1A is a top plan view of a pallet cart, in accordance with a preferred embodiment of the invention;
FIG. 1B is a front view of the cart of FIG. 1A;
FIG. 1C is a rear view of the cart of FIG. 1A;
FIG. 1D is a side view of the cart of FIG. 1A;
FIG. 4A is a top plan view of the middle cross beam of the cart of FIG. 1A;
FIG. 4B is a front view of the middle cross beam of FIG. 4A;
FIG. 4C is a side view of the middle cross beam of FIG. 4A;
FIG. 5A is a top plan view of the front corner member of the cart of FIG. 1A;
FIG. 5B is a front view of the front corner member of FIG. 5A;
FIG. 5C is a side view of the front corner member of FIG. 5A;
FIG. 6A is a top plan view of the rear corner member of the cart of FIG. 1A;
FIG. 6B is a front view of the rear corner member of FIG. 5A;
FIG. 6C is a side view of the rear corner member of FIG. 5A;
FIG. 7A is a top plan view of a pallet cart, in accordance with another preferred embodiment of the invention;
FIG. 7B is a front view of the cart of FIG. 7A;
FIG. 7C is a rear view of the cart of FIG. 7A;
FIG. 7D is a side view of the cart of FIG. 7A;
FIG. 9A is a top plan view of the front cross beam of the cart of FIG. 7A;
FIG. 9B is a front view of the front cross beam of FIG. 9A;
FIG. 9C is a side view of the front cross beam of FIG. 9A;
FIG. 10A is a top plan view of the middle support bracket of the cart of FIG. 7A;
FIG. 10B is a front view of the middle support bracket of FIG. 10A;
FIG. 10C is a side view of the middle support bracket of FIG. 10A;
FIG. 11A is a top plan view of the middle cross beam of the cart of FIG. 7A;
FIG. 11B is a front view of the middle cross beam of FIG. 11A;
FIG. 11C is a side view of the middle cross beam of FIG. 11A;
FIG. 14A is a top plan view of the rear cross beam of the cart of FIG. 7A;
FIG. 14B is a side view of the rear cross beam of FIG. 14A;
and
FIG. 14C is a rear view of the rear cross beam of FIG. 14A.

The figures are for illustration only and should not be interpreted as limiting. Similar parts are assigned the same reference numerals. The proportions of the parts are illustrative and the invention can be practiced outside the scale of the drawings.

DETAILED DESCRIPTION OF THE PREFERRED EMBODIMENTS

Figure 2A:
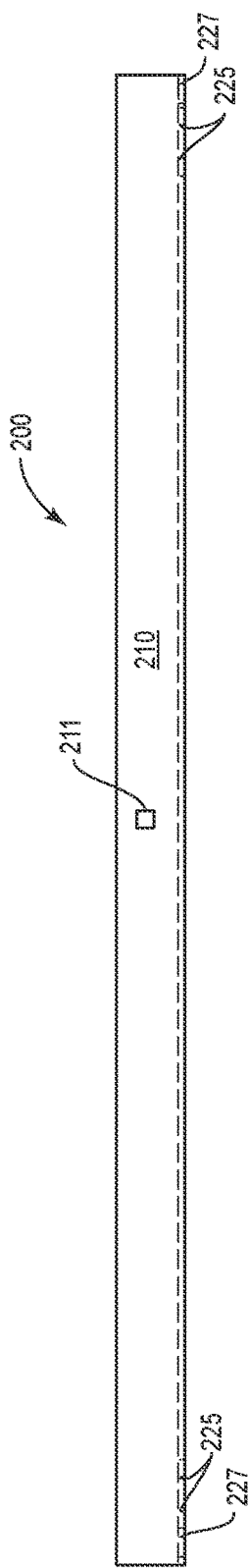
FIG. 2A is a top plan view of the left side beam of the cart of FIG. 1A.

The present disclosure may be understood more readily by reference to the following detailed description of the disclosure, taken in connection with the accompanying figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

A cart in accordance with preferred embodiments of the invention is shown generally in FIGS. 1A-1D as a cart 100. Cart 100 is constructed of materials and is configured and assembled to be strong enough to transport pallets loaded with goods in a warehouse storage facility, weighing over 2000 lb, 2500 lb and even over 3000 lb. Steel is the preferred material. Thicknesses over 0.15 inches are preferred, more preferred is 0.15 to 0.3 inches, especially about 0.15-0.2 inches. Such carts will often weigh over 35 or 45 pounds.

Cart 100 has a front end 101, a rear end 102, a left side 103 and a right side 104. Cart 100 includes a left-side beam 200 and a right-side side beam 200 identical to left side beam 200. Side beams 200 extend in a front or forward direction from rear end 102 to front end 101. Cart 100 also includes three cross beams, which are perpendicular to and releasably connect left-side beam 200 with right-side beam 200.

Figure 2B:
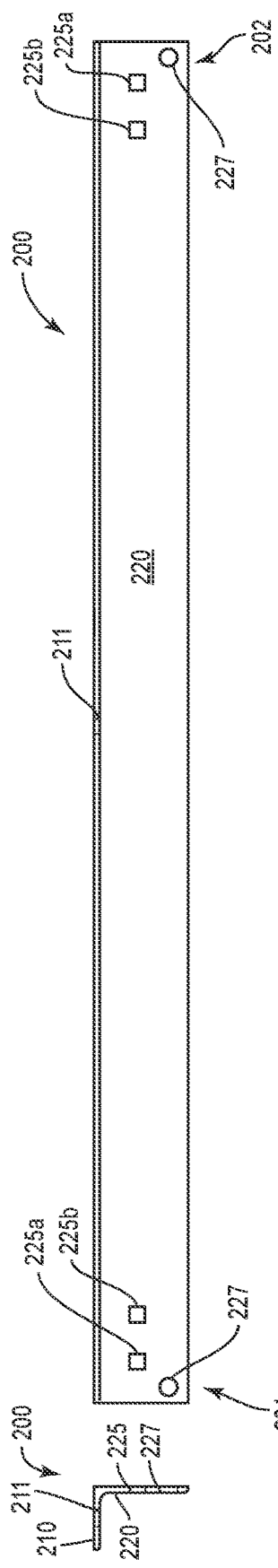
FIG. 2B is a side view of the left side beam of FIG. 2A.
Figure 2C:
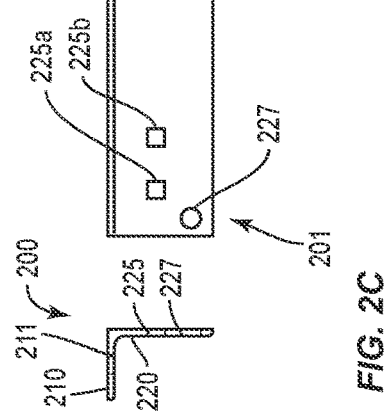
FIG. 2C is a front view of the left side beam of FIG. 2A.

Side beam 200 (left or right) is shown in greater detail in FIGS. 2A-2C. Side beam 200 is formed as an angle bracket with a horizontal side top wall 210 and a side vertical wall 220. The dimensions of side top wall 210 and side vertical wall 220 can be substantially the same or different. For example, side top wall 210 can be wider or narrower than the height of side vertical wall 220. In one embodiment of the invention, side vertical wall 220 can be about 25-100% taller than the width of side top wall 210. In an embodiment of the invention, side top wall 210 is at least about 1.5 inches wide, more preferably 1.5 to 2.5 inches wide, most preferably about 2 inches wide; and side vertical wall 220 is at least about 1.5 inches tall, more preferably about 2.5 to 3.5 inches tall, and most preferably about 3 inches tall. Side beam 200 is preferably over 30 inches long. It is preferably about 30-55 inches long, more preferably about 35-50 inches, most preferably about 40-45 inches. Side beam 200 is preferably formed from steel over 0.15 inches thick.

In a preferred embodiment of the invention, the left side beam is identical to the right side beam. It is formed with a bolt receiving hole 211 through side top wall 210 at the approximate midpoint of its length, to be used to help releasably attach a middle cross beam 400, described below. Hole 211 is preferably located at the mid-width of top side top wall 210. Bolt receiving hole 211 can be square or shaped, to receive a carriage bolt-style bolt and is preferably formed to receive about a half-inch diameter bolt.

Side vertical wall 220 is preferably formed with bolt receiving holes 225 to secure a front clip 500 or a rear clip 600 (described below) as a corner bracket attachment member for securing crossing members and supporting a wheel 577. Holes 225 can be square and should have a nominal diameter of about half an inch. Holes 225 should be at about the midpoint of the height of side vertical side 220.

An end-most hole 225a can be placed about 1-2 inches from an end of side beam 200 and inner-most hole 225b can be about 2.5-3.5 inches from the end. Other distances can be appropriate. It is preferred that bolt receiving holes 225 on a front end 201 of side beam 200 mirror holes 225 on a rear end 202 of side beam 200, so that an identical side beam 200 can be used for both the left and right sides of cart 100.

Side beam 200 is also formed with an axle receiving hole 227 at both front end 201 and rear end 202. Axle receiving hole 227 is preferably circular and sized to receive an axle for wheel 577. Diameters of about half an inch and slightly larger are preferred, but depend on the dimensions of the wheel axle. In one embodiment of the invention, there is about half an inch of clearance between axle receiving hole 227 and front and 201 and rear end 202 of side beam 200. Axle receiving hole 227 can be about 0.5 to 1 inch from the bottom of side vertical wall 220. Hole 227 at front end 201 should be the mirror image of hole 227 at rear end 202, so that side beam 200 can be used for both the left side and right side of cart 100.

A front cross beam 300 at front end 101 of cart 100 connects front ends 201 of left and right side beams 200. Front beam 300 can be identical to a rear cross beam 300' at rear end 102 of cart. In this manner, the same cross beam part can be used at both the front and rear of cart 100. Front cross beam 300 can have different dimensions from rear cross beam 300' if the same piece is not to be used as both a front and rear cross beam. Front beam 300 can be at least about 25 inches wide, preferably about 30-35 inches wide.

Figure 3A:
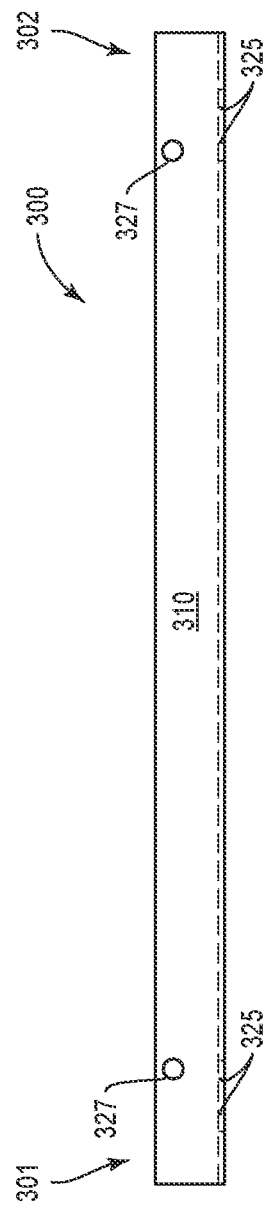
FIG. 3A is a top plan view of the front cross beam of the cart of FIG. 1A.
Figure 3B:
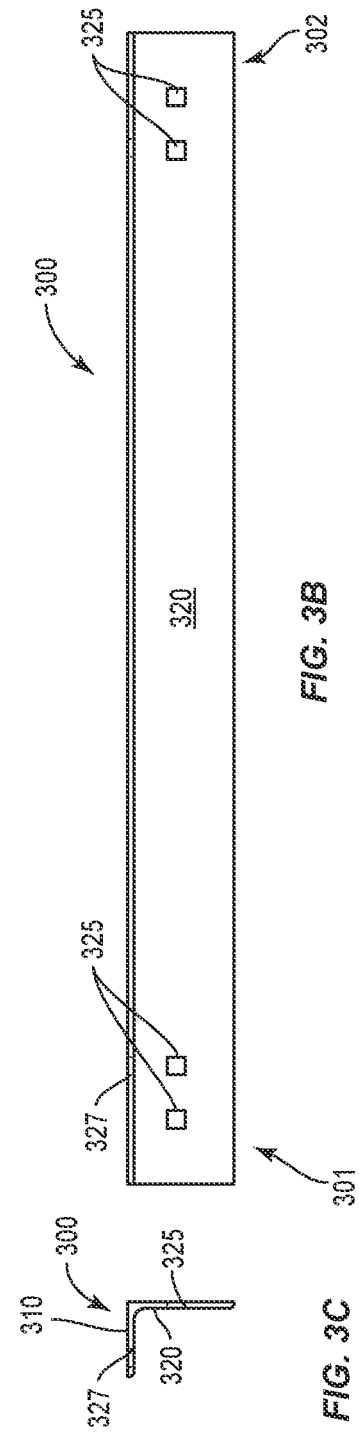
FIG. 3B is a front view of the front cross beam of FIG. 3A.
Figure 3C:
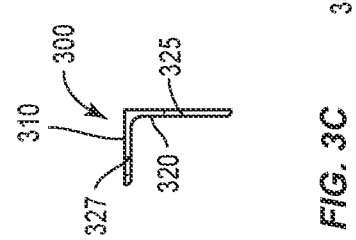
FIG. 3C is a side view of the front cross beam of FIG. 3A.

Front cross beam 300 (and 300') is shown in greater detail in FIGS. 3A-3C. Front beam 300 is shaped as an angle bracket rail with a front top wall flange 310 and a front vertical wall 320. Front top wall 310 can have the same width dimension as the height of front vertical wall 320. Alternatively, they can differ in dimensions, such as a top to side ratio of about 2:3. In one preferred embodiment of the invention, front top wall 310 should be at least about 1.5 inches wide, preferably about 1.75-2.5 inches. Front beam 300 is preferably made from steel, over 0.15 inches thick, especially about 3/16 inches thick.

Front vertical wall 320 should be at least about 2 inches, more preferably about 2.75-3.25 inches. Front top wall 310 can extend in the forward direction away from cart 100 from front end 101. Rear cross beam 300' can extend in a rearward direction (opposite the forward direction) away from cart 100 from rear end 102. Alternatively, these top flanges can point into the cart. This has an effect on how the cart will contact another cart more forward in the bay or how it will contact the stop structures at the front of the bay. A flange extending outward and over the stop effectively lengthens the pallet support surface of cart 100 at the front and rear ends of cart 100.

One advantage of the flange of front top wall 310 extending forward, is the ability to align the front support surfaces of the one or more carts at the front of a bay with the front of the bay. Traditionally, this flange would extend to the rear of the cart. The front of the cart contacts a stop at the front of the bay and the top support surface of the cart is stopped slightly rearward of the front of the bay. This problem can be multiplied by nesting carts. However, with the flange extending forward and over the stop, the top support surface of the cart can be flush with the front plane of the bay. This can be particularly important with multi-level storage bays and high bays.

A left end 301 and a right end 302 of front beam 300 is formed with bolt receiving holes 325 to attach front beam 300 (and rear beam 300') to side beam 200 with a corner bracket, as discussed below. These holes can be positioned about 1.5 to 2.5 and 3.0-4.0 inches respectively from the respective left and right ends 301 and 302 of front beam 300. The holes should be positioned at about the midpoint of the height of front vertical wall 320.

A circular hole 327 can be formed through front top wall 310. Hole 327 can be used to receive a stop member, such as a bolt 329, to keep the pallet from sliding past the front of cart 100. For example, a bolt, not shown, can extend up through hole 327 to act as the stop.

A middle beam 400 (optional, but preferable) extends horizontally from left side beam 200 to right side beam 200. In one preferred embodiment of the invention, middle beam 400 is identical with and includes identical holes as front beam 300 and optionally also rear beam 300'. In another embodiment of the invention, middle beam 400 is positioned inside the inner facing surfaces of side beams 200 and is slightly shorter than front beam 300 and/or rear beam 300'. Middle beam 400 is shown in greater detail in FIGS. 4A-4C.

Middle beam 400 includes a left end 401 and a right end 402. It also includes a top middle surface 410 and a vertical middle surface 420. Middle beam 400 is formed with bolt receiving holes 425 to connect middle beam 400 to left and right side beams 200. Holes 425 should be sized to receive a half-inch bolt and can be square or otherwise shaped to engage a carriage style bolt. Holes 425 should be at the approximate width-wise center of top middle surface 410. Top middle surface 410 can have a width of at least about 1.5 inches, preferably about 2 inches and a middle vertical wall 420 can have a height of at least about 2 inches, preferably about 3 inches. These dimensions can be extended or decreased by about half an inch. The ratio of the height of vertical middle wall to top middle surface 410 can be from about 1:1 to 3:2. Optionally, they can be identical and hole 425 can be formed through surface 410 and wall 420 for greater flexibility in part usage. Middle beam 400 should be at least 0.15 inch thick. Bolt receiving hole 425 should be positioned from left end 401 and right end 402 so that it aligns with bolt receiving hole 211 in side beam 200.

Referring to FIGS. 5A-5C, front clip 500 is configured to be a universal connection bracket for either all four corners of cart 100 or at least the two corners at front end 101 of cart 100. Front clip 500 includes a first arm 510 and a second arm 520 to attach a front or rear beam 300 (300') to a left or right side beam 200 and to support one wheel 577. Each arm (510 and 520) includes a pair of bolt receiving holes 525 and an axle opening 527. Arms 510 and 520 should be at right angles and extend from a juncture 540. They should be symmetrical, so as to be used for wither the left or the right sides of cart 100. Front clip 500 should be at least 0.15 inches thick, and can preferably be over 0.2 inches thick, even 0.25 inches or more.

First arm 510 and second arm 520 can have the same dimensions. E.g., about 4×4 inches. The height of front clip 500 can be at least about 2.5 inches tall, preferably about 3 to 4 inches tall, most preferably about 3.5-3.75 inches tall. Bolt receiving holes 525 should be about half an inch in diameter and can be square or otherwise shaped, to accept a carriage-type bolt. Bolt receiving holes 525 are preferably arranged asymmetrically on first arm 510 and on second arm 520, preferably about 1-1.5 inches apart and shifted towards the portion of the arms away from juncture 540. Axle receiving hole 527 should be about 0.5-0.6 inches diameter and can be approximately centered on the arm from juncture 540 and spaced about 0.5-0.75 inches from the lower edge of each arm 510 and 520. Bolt receiving holes 525 should be at least about 1.75 inches above axle receiving hole 527, preferably about 1.75 to 3 inches, more preferably about 2 to 2.5 inches.

In a preferred embodiment of the invention, the front end of front top surface 310 from axle receiving hole 527, measured in the forward direction, is at least 3.5 inches, preferably about 4 to 5 inches. These dimensions are advantageous for providing one or more carts to rest flush with the front of the storage bay.

Referring to FIGS. 6A-6C, rear clip 600 is configured to be universal for either the left or right ends of rear beam 300'. Rear clip 600 includes a first arm 610 and a second arm 620 to attach a front or rear beam 300 (300') to a left or right side beam 200 and to support a wheel 577. Each arm (610 and 620) includes a pair of bolt receiving holes 625 and an axle opening 627. Arms 610 and 620 should be at right angles, and extend from a juncture 640.

First arm 610 and second arm 620 can have the same dimensions. The height of rear clip 600 can be at least about 1.75 inches tall, preferably about 2 to 3 inches tall, most preferably about 2.25-2.75 inches tall. It should be at least 0.15 inches thick. Bolt receiving holes 625 should be about half an inch in diameter and can be square or otherwise shaped, to accept a carriage-type bolt. Bolt receiving holes 625 are preferably arranged asymmetrically on first arm 610 and second arm 620, preferably about 1-1.5 inches apart and offset towards the portion of the arms away from juncture 640. Axle receiving hole 627 should be about 0.5-0.6 inches diameter and can be closer on each arm to juncture 640 than to the ends of each arm, to shift wheel 577 towards the ends of the cart. Bolt receiving holes 625 can be about 1.5 or less inches above axle receiving hole 627, preferably about 0.5-1.5 inches, more preferably about 0.75-1.25 inches.

A cart in accordance with another preferred embodiments of the invention for transporting pallets loaded with goods, on rails in a warehouse storage facility, is shown generally in FIGS. 7A-7D as a cart 150. Cart 150 has a front end 151, a rear end 152, a left side 153 and a right side 154. Cart 150 includes a left-side and a right-side side beam 250, which both run from front end 151 to rear end 152. Cart 150 also includes three cross beams, which are perpendicular to and connect left-side beam 250 with right-side beam 250. These cross beams, discussed below, can be identical, or different. Steel is the preferred material, preferably over 0.15 inches thick, especially about 3/16 inch thick.

Figure 8A:
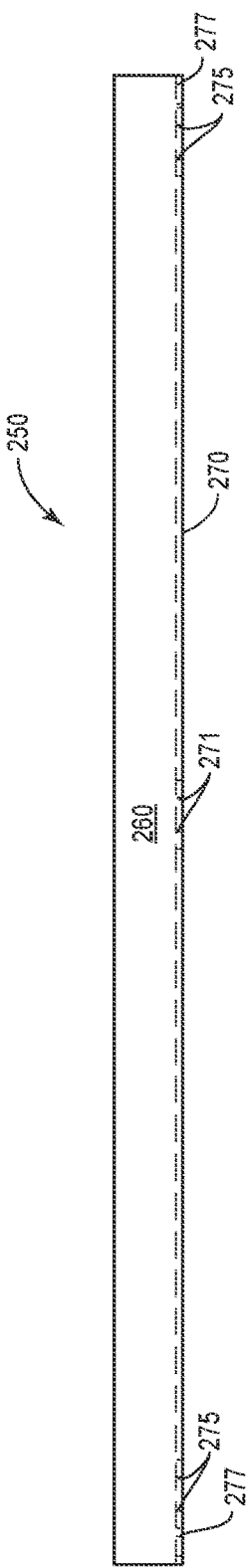
FIG. 8A is a top plan view of the left side beam of the cart of FIG. 7A.
Figure 8B:
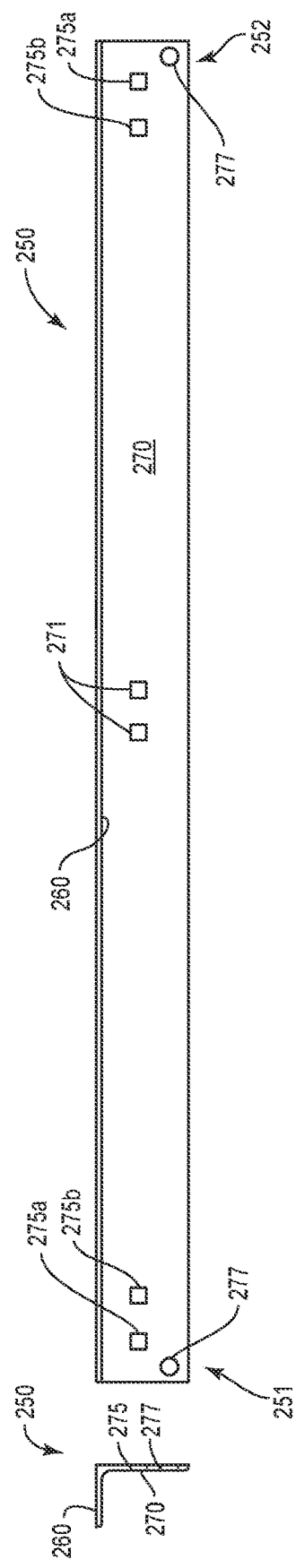
FIG. 8B is a side view of the left side beam of FIG. 8A.
Figure 8C:
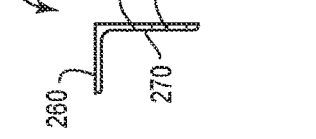
FIG. 8C is a front view of the left side beam of FIG. 8A.

Side beam 250 is shown more clearly in FIGS. 8A-8C. Side beam 250 is formed as an angle bracket (L-shaped cross section) with a top side surface 260 and a vertical side wall 270. The dimensions of top side surface 260 and vertical side wall 270 can be substantially the same or different. For example, top side surface 260 can be wider or shorter than vertical side wall 270. In one embodiment of the invention, the ration of vertical side wall 270 to top side surface 260 can be about 1:1, to 3:2. It can be about 25-100% longer than top side surface 260. In another embodiment of the invention, top side surface 260 is at least about 1.5 inches wide, more preferably 1.5 to 2.5 inches wide, most preferably about 2 inches wide and vertical side wall 270 is at least about 1.5 inches tall, more preferably about 2.5 to 3.5 inches tall, and most preferably about 3 inches tall. Side beam 250 is preferably at least about 30 inches long, more preferably about 35-50 inches, most preferably about 40-45 inches.

In a preferred embodiment of the invention, left side beam 250 is identical to right side beam 250. It is formed with a pair of bolt receiving holes 271 at the approximate midpoint of its length, to secure middle cross beam 450. Holes 271 are preferably located at the mid-with of vertical side wall 270. Bolt receiving holes 271 can be square or shaped, to receive a carriage bolt-style bolt and are preferably formed to receive about a half-inch diameter bolt. It is advantageous to attach cross beam 450 to side vertical wall 270, so that the load is on a vertical wall, which is more stable for supporting loads than a horizontal wall, which is in a cantilever configuration.

Side vertical wall 270 is preferably formed with bolt receiving holes 275 to secure a front clip 500 or a rear clip 600 as a corner attachment bracket for securing crossing beams and supporting a wheel 577. Holes 275 can be for a carriage style bolt and should have a nominal diameter of about half an inch. An end-most hole 275a can be placed about 1-2 inches from an end of side beam 250 and innermost hole 275b can be about 2.5-3.5 inches from the end. Other distances can be appropriate. It is preferred that bolt receiving holes 275 on a front end 251 of side beam 250 mirror holes 275 on a rear end 252 of side beam 250, so that an identical side beam 250 can be used for both the left and right sides (153 and 154) of cart 150.

Side beam 250 is also formed with an axle receiving hole 277 at both front end 251 and rear end 252. Axle receiving hole 257 is preferably circular and sized to receive an axle for one wheel 577. Diameters of about half an inch and slightly larger are preferred, but depend on the dimensions of the wheel axle. In one embodiment of the invention, there is about half an inch of clearance between hole 277 and front end 251 or rear end 252 of side beam 250. Axle receiving hole 277 can be about 0.5 to 1 inch from the bottom of the vertical side wall 270. Hole 277 at front end 251 should be the mirror image of hole 227 at rear end 252, so that side beam 250 can be used for both the left side (253) and right side (254) of cart 150. Note that in cart 150, side top wall 260 extends outwards, over wheels 577. This provides room for a middle cross beam to be level with the height of side beams 250.

A front beam 350 at front end 151 of cart 150 connects front ends 151 of left and right side beams 250. Front beam 350 can be identical to a rear beam at rear end 152 of cart 150. In this manner, the same part can be used at both the front and rear of cart 150. They can also have different dimensions. Front beam 350 can be at least about 25 inches wide, preferably about 30-35 inches wide.

Front beam 350 is shown in greater detail in FIGS. 9A-9C. Front beam 350 is shaped as an angle bracket (L-shaped cross section) with a front top surface 360 and a front vertical wall 370. Front top surface 360 faces forward from the front (and rear) end of cart 150. One advantage of an outwardly extending front top wall is to enlarge the supportive surface of the cart. It can also extend over a stop at the front of the bay, permitting the front edge of the cart to come flush to the front end of a storage bay.

Front top surface 360 can have the same with dimension as the height of front vertical wall 370. Alternatively, they can differ in dimensions. In one preferred embodiment of the invention, front top surface 360 and vertical wall 370 can be about 2.5-3.5 inches, preferably about 2.75-3.25, most preferably about 3 inches. In another preferred embodiment, front top wall is about 2 inches wide and front vertical wall is about 3 inches tall.

In another embodiment of the invention, shown in FIGS. 14A-14C, a rear beam 375 takes the place of a rear beam identical to front beam 350. Rear beam 375 includes a rear vertical wall 376 that can be about 3.5-2.5 inches, more preferably about 3.25-2.75 inches tall. Rear beam 375 is shaped like an angle bracket with two perpendicular arms and also includes a top rear surface 377. A rear top surface 377 extends in a rearward direction away from rear end 152 of cart 150 and can have a width of 1.5 to 2.5 inches, preferably about 1.75 to 2.25 inches, most preferably about 2 inches.

A left end 351 and a right end 352 of front vertical wall 370 is formed with bolt receiving holes 325 to attach two side beams 250 with a corner attachment brackets, as discussed below. These holes can be positioned about 1.5 to 2.5 and 3.0-4.0 inches respectively from the respective left and right ends 351 and 352 of front beam 370. The holes should be positioned at about the midpoint and the height of front vertical wall 370. A hole 327 can be formed through front top surface 360. Hole 327 can receive a bolt or other stop structure to help keep pallets from sliding forward off the top surface of cart 150.

A middle beam 450 extends horizontally from left side beam 250 to right side beam 250. In one preferred embodiment of the invention, middle beam 450 is identical with and includes identical holes as front beam 350 or rear beam 375. In another embodiment of the invention, middle beam 450 is positioned inside side beams 250 and can be slightly shorter than front beam 350. It can be the same height as side beams 250 to present a flat support surface of cart 150. As with middle beam 400, middle beam 450 can include holes to bolt it directly to side beams 250, or preferably, middle beam 450 can be attached to side vertical wall 270 so that the load is on a vertical wall, as discussed below. Middle beam 450 is shown in greater detail in FIGS. 11A-11C.

Middle beam 450 includes a left end 451 and a right and 452. It also includes a middle top surface 460 and a middle vertical surface 470. Middle beam 450 is formed with a pair of bolt receiving holes 426 to connect middle beam 450 to a pair of brackets 475 discussed with reference to FIGS. 10A-10C, to secure middle beam 450 to left and right side beams 250. Holes 426 should be sized to receive a half-inch bolt. Holes 426 should be in the approximate height-wise center of middle vertical wall 470.

Middle top surface 460 can have a width of about 2 inches and middle vertical wall 470 can have a height of about 3 inches. These dimensions can be increased or decreased by up to about half an inch or more. Optionally, walls 460 and 470 can be identical and hole 426 can be also formed through top surface 460 in order to provide greater interchangeability in part usage.

Figure 12A:
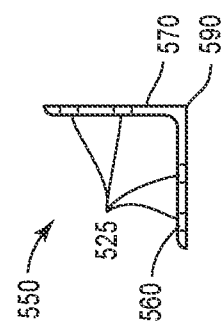
FIG. 12A is a top plan view of the front corner member of the cart of FIG. 7A.
Figure 12B:
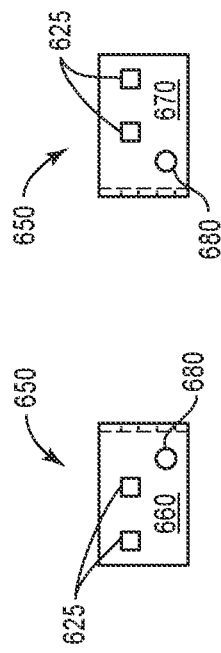
FIG. 12B is a front view of the front corner member of FIG. 12A.
Figure 12C:
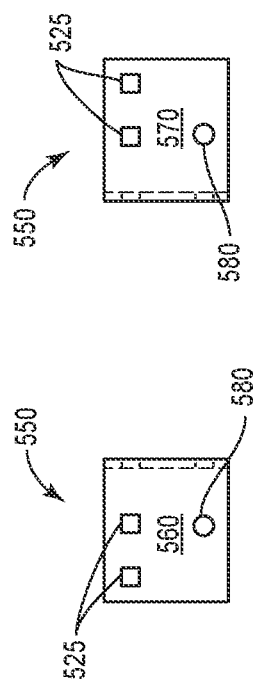
FIG. 12C is a side view of the front corner member of FIG. 12A.

Referring to FIGS. 12A-12C, a front clip 550 is configured to be universal for either all four corners of cart 150 or at least the two corners at front end 151. Front clip 550 includes a first arm 560 and a second arm 570 to attach a front or rear beam 350 (350') or 375 to a left or right side beam 250 and to support one wheel 577. Each arm (560 and 570) includes a pair of bolt receiving holes 525 and an axle opening 580. Arms 560 and 570 should be at right angles and extend from a juncture 590.

First arm 560 and second arm 570 can have the same dimensions. Each can be 4×4 inches. The height of front clip 550 can be about 2.5 to 4.5 inches tall, preferably about 3 to 4 inches tall, most preferably about 3.25-3.75 inches tall.

Bolt receiving holes 525 should be about half an inch in diameter and can be square or shaped to accept a carriage-type bolt. Bolt receiving holes 525 are preferably arranged offset on first arm 560 and second arm 570, preferably about 1-1.5 inches apart and offset towards the portion of the arms away from juncture 590. Axle receiving hole 580 should be about 0.5-0.6 inches diameter and can be approximately centered at the distance from juncture 550 and spaced about 0.5-0.75 inches from the lower edge of each arm 560 and 570.

Figure 13A:
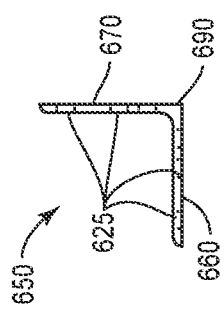
FIG. 13A is a top plan view of the rear corner member of the cart of FIG. 7A.
Figure 13B:
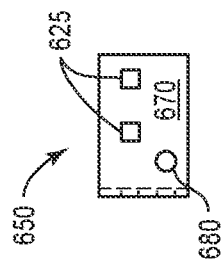
FIG. 13B is a side view of the rear corner member of FIG. 13A.
Figure 13C:
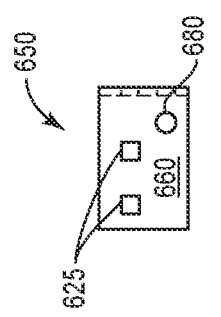
FIG. 13C is a rear view of the rear corner member of FIG. 13A.

Referring to FIGS. 13A-13C, a rear clip 650 is configured to be universal for either the left or right ends of rear beam 350' or 375. Rear clip 650 can be shorter than front clip 550 so that front wheels 577 can be farther from the top of cart 150 to make it flat if the rails are pitched. Rear clip 650 includes a first arm 660 and a second arm 670 to attach a rear beam 375 to a left or right side beam 250 and to support one wheel 577 each. Each arm (660 and 670) includes a pair of bolt receiving holes 625 and an axle opening 680. Arms 660 and 670 should be at right angles, and extend from a juncture 690.

First arm 660 and second arm 670 can have the same dimensions. The height of rear clip 650 can be about 1.75 to 3.5 inches tall, preferably about 2 to 3 inches tall, most preferably about 2.25-2.75 inches tall. Bolt receiving holes 625 should be about half an inch in diameter and can be shaped to accept a carriage-type bolt. Bolt receiving holes 625 are preferably arranged offset on first arm 660 and on second arm 670, preferably about 1-1.5 inches apart and towards the portion of the arms away from juncture 690. Axle receiving hole 680 should be about 0.5-0.6 inches diameter and can be closer on each arm to juncture 690 than to the ends of each arm.

As described above, middle beam 450 can be secured to side beams 250 with a middle support bracket 475 shown in FIGS. 10A-10C. Middle support bracket 475 is shaped like an angle bracket, with a pair of perpendicular arms 476 and 477. Each arm includes a pair of bolt receiving holes 478. The diameter of holes 478 should be sized to receive a half-inch bolt, to attach the vertical wall 270 to vertical wall 470. Middle support brackets 475 can be over about 1.5 inches high, preferably about 1.75-2.5 inches high. Bolt receiving holes 478 should be at the approximate center, height-wise.

Note that where this application has listed the steps of a method or procedure in a specific order, it may be possible, or even expedient in certain circumstances, to change the order in which some steps are performed, and it is intended that the particular steps of the method or procedure claim set forth herebelow not be construed as being order-specific unless such order specificity is expressly stated in the claims.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. A pallet support cart having an upwardly facing top support surface, comprising:
   an elongated left side side beam and an elongated right side side beam, each extending from a front end to a rear end of the cart, the left and right side beams having a side top wall perpendicular to and over a side vertical wall, the respective front ends of the side vertical walls each including at least one bolt receiving hole over at least one axle receiving hole therethrough, the respective rear ends of the side vertical walls including at least one bolt receiving hole over at least one axle receiving hole therethrough, positioned as a symmetrical mirror image of the bolt receiving holes and axle receiving holes through the front ends of the side vertical walls, whereby the left and right side beams are interchangeable;
   a front cross beam having a left end and a right end, extending perpendicularly from the left side beam to the right side beam at the front end of the cart, the front cross beam having a front top wall perpendicular to a front vertical wall;
   a rear cross beam having a left end and a right end, extending perpendicularly from the left side beam to the right side beam at the rear end of the cart, the rear cross beam having a rear top wall perpendicular to a rear vertical wall;
   a left front clip having an L-shaped cross section at a left front corner of the cart, with a front arm parallel to the front cross beam and a side arm perpendicular the front arm and parallel to the left side beam, the front arm having a bolt receiving hole therethrough, over an axle receiving hole therethrough, the side arm configured symmetrically to the front arm, and a right front clip at a right front corner of the cart, dimensioned substantially identical to the left front clip;
   a left rear clip having an L-shaped cross section at a left rear corner of the cart, with a rear arm parallel to the rear cross beam, and a rear-side arm perpendicular to the rear arm, and parallel to the left side beam, the rear arm having at least one bolt receiving hole over at least one axle receiving hole therethrough, and the rear-side arm configured symmetrically to the rear arm, and a right rear clip at a right rear corner of the cart having substantially identical dimensions as the left front clip;
   the front beam bolted to the left side beam and the left front clip at the left front corner, and the front beam bolted to the right side beam and the right front clip at the right front corner;
   the rear beam bolted to the left side beam and the left rear clip at the left rear corner, and the rear beam bolted to the right side beam and the right rear clip at the right rear corner;
   a wheel functionally coupled to an axle extending through the axle receiving holes through the left and right side beams and front and rear clips at the left and right front and rear corners; and
   wherein the cart, including the front beam, left and right side beams, rear beam, clips, wheels and axles are constructed of materials strong enough and configured to transport a pallet loaded with at least 2000 pounds.

2. A pallet support cart having an upward facing top support surface, a left side, a right side, a front end and a rear end, and defining a forward direction from the rear end to the front end, comprising:
   a front cross beam at the front end of the cart, having at least one bolt receiving hole at a left end thereof and at least one bolt receiving hole at a right end thereof, the bolt receiving hole on the left end arranged with respect to the left end of the front cross beam to be symmetrical with the arrangement of the bolt receiving hole on the right end of the front cross beam;
   a left side beam at the left side of the cart, releasably attached to the front cross beam at a front left corner of the cart, and having at least one bolt receiving hole and at least one axle receiving hole at a front end thereof and at least one bolt receiving hole and at least one axle receiving hole at a rear end thereof, the bolt receiving hole and axle receiving hole on the front end arranged with respect to the front of the left side beam to be symmetrical with the arrangement of the bolt receiving hole and axle receiving hole on the rear end of the left side beam;

a right side beam on the right side of the cart releasably attached to the front cross beam at a front right corner of the cart, and having a plurality of bolt receiving holes and axle receiving holes, arranged identical to the bolt receiving holes and axle receiving holes on the left side beam, whereby the right side beam can be interchanged to the left side beam;

a rear cross beam at a rear end of the cart releasably attached to the left side beam and right side beam, and having at least one bolt receiving hole at a left end thereof and at least one bolt receiving hole at a right end thereof, the bolt receiving hole on the left end arranged with respect to the left end of the rear cross beam to be symmetrical with to the arrangement of the bolt receiving hole on the right end of the rear cross beam;

a front left corner bracket clip at the front left corner of the cart, having a front wall parallel to the front cross beam and at least one bolt receiving hole aligned with the bolt receiving hole through the left end of the front cross beam, with a bolt therethrough, and having a side wall parallel to the left side beam and at least one bolt receiving hole aligned with the bolt receiving hole through the front end of the left side beam with a bolt therethrough, and an axle receiving hole aligned with the axle receiving hole at the front end of the left side beam, and a front right corner bracket clip constructed and dimensioned to be interchangeable with the front left corner bracket clip, and bolted to the front cross beam and right side beam at the front right corner;

a rear left corner bracket clip at the rear left corner of the cart, having a rear wall parallel to the rear cross beam and at least one bolt receiving hole aligned with the bolt receiving hole at the left end of the rear cross beam, with a bolt therethrough and having a side wall parallel to the left side beam and at least one bolt receiving hole aligned with the bolt receiving hole at the rear end of the left side beam with a bolt therethrough, and an axle receiving hole aligned with the axle receiving hole at the rear end of the left side beam, and a rear right corner bracket clip constructed and dimensioned to be interchangeable with the rear left corner bracket clip, and bolted to the rear cross beam and right side beam at the rear right corner;

a wheel functionally coupled to an axle extending through a respective axle receiving hole through the front and rear ends of the left and right side beams and left and right, front and rear clips; and wherein the cart, including the front beam, left and right side beams, rear beam, clips, wheels and axles are constructed of materials strong enough and configured to transport a pallet loaded with at least 2000 pounds.

3. The pallet support cart of claim 2, wherein the left side beam and right side beam each have an L-shaped cross section with a side top wall and a perpendicular side vertical wall, and comprising a middle cross beam having a left end and a right end, releasably attached to the left side beam and the right side beam, respectively, positioned between the front cross beam and the rear cross beam, the middle cross beam having a middle beam top wall facing up, with at a bolt receiving hole at the left end and the right end, and the left side beam and right side beam have bolt receiving holes through the side top walls thereof, aligned with the respective bolt receiving holes of the middle cross beam, with a bolt therethrough.

4. The pallet support cart of claim 2, and comprising a middle cross beam having a left end and a right end, releasably attached to the left side beam and the right side beam, respectively, positioned between the front cross beam and the rear cross beam, wherein the left side beam and the right side beam each have an L-shaped cross section with a side top wall and a perpendicular side vertical wall, and a mic-point bolt receiving hole extends through the side vertical walls of the left side beam and the right side beam, at the location of attachment of the middle cross beam;

the middle cross beam having a vertical middle beam vertical wall, with a bolt receiving hole at the left end and right ends thereof;

and comprising a left middle bracket clip having an L-shaped cross section with a middle arm having a bolt receiving hole therethrough aligned with the bolt receiving hole through the left end of the middle cross beam, and a side arm having a bolt receiving hole therethrough aligned with the mid-point bolt receiving holes of the left and the right side beams, with a bolt therethrough and a right middle bracket clip bolted to the middle cross beam and the right side beam, having dimensions and arranged to be interchangeable with the left middle bracket clip.

5. A pallet support cart having an upward facing top support surface, a left side, a right side, a front end and a rear end, and defining a forward direction from the rear end to the front end, comprising:

a front beam having a left end and a right end and two bolt receiving holes through each end arranged as mirror images of each other;

a left front bracket and a right front bracket bolted to the left and right ends of the front beam and having an axle receiving hole therethrough;

a left side beam and a right side beam, each having a front end and a rear end and two bolt receiving holes and one axle receiving hole on each end, arranged as mirror images of each other and the left side beam having the same arrangement of the four bolt receiving holes and the two axle receiving holes, the respective front ends of the left side beam and right side beam bolted to the left front bracket and right front bracket;

a middle beam having a left end bolted to the left side beam and a right end, bolted to the right side beam;

a left rear bracket bolted to the rear end of the left side beam and a right rear bracket bolted to the rear end of the right side beam and having an axle receiving hole therethrough;

a rear beam having a left end bolted to the left rear bracket and a right end bolted to the right rear bracket, the rear beam having two bolt receiving holes on the left end arranged as a mirror image of each other; and a height of the bolt receiving holes above the axle receiving hole of the left and right front brackets is greater than the height of the bolt receiving holes above the axle receiving hole of the left and right rear brackets.

6. The pallet support cart of claim 5, wherein the front beam has an L-shaped cross section, with a front top wall facing up and a vertical front vertical wall extending down from a front vertex joining the front top wall to the front vertical wall, the front top wall extending forward from the front vertex in the forward direction.

7. The pallet support cart of claim 5, wherein the right front bracket includes a front wall facing the front beam and a side wall facing the right side beam and a vertex connecting the front wall and side wall, and the left front bracket includes a front wall facing the front beam and a side wall facing the left side beam and a vertex connecting the front wall and side wall, and the side wall of the right front bracket includes at least two bolt receiving holes through an upper portion thereof, and at least one axle receiving hole below the at least two bolt receiving holes, and the front wall of the right front bracket includes at least two bolt receiving holes and at least one axle receiving hole therethrough, positioned at the same dimensions from a top and a bottom edge of the front wall and the same distance from the vertex as the two bolt receiving holes and the axle receiving hole through the side wall, and the right front bracket is interchangeable with the left front bracket with respect to the bolt receiving holes and axle receiving holes.

8. The pallet support cart of claim 5, wherein a height of the bolt receiving holes above the axle receiving hole of the left and right front brackets is at least about 1.75 inches and the height of the bolt receiving hole above the axle receiving hole of the left and right rear brackets is no more than about 1.5 inches.

9. The pallet support cart of claim 5, wherein the height of the left rear and the right rear brackets is at least about 2.5 inches.

10. The pallet support cart of claim 5, wherein the height of the left front and the right front brackets is about 3 to 4 inches.

11. The pallet support cart of claim 10, wherein the height of the left rear and the right rear brackets is at least about 1.75 inches, and less than the height of the left front and the right front brackets.

12. The pallet support cart of claim 5, wherein the left side beam and the right side beam is at least 1.5 inches tall.

13. The pallet support cart of claim 5, wherein the front beam is about 2.75 to 2.25 inches tall.

14. The pallet support cart of claim 5, wherein the front beam has a horizontal top wall, level with a top surface of the right side beam and the left side beam, and extends in the forward direction from the left side and right side beams.

15. The pallet support cart of claim 14, wherein, the distance in the forward direction from the axle receiving hole through the left front and the right front brackets to a front end of the horizontal top wall is at least 3.5 inches.

16. The pallet support cart of claim 14, wherein the distance in the forward direction from the axle receiving hole through the left front and the right front brackets to a front end of the horizontal top wall to is about 4 to 5 inches.

17. The pallet support cart of claim 5, wherein the front beam is constructed and dimensioned to be interchangeable with the rear cross beam to provide an identical cart.

18. The pallet support cart of claim 5, wherein the front beam and the rear beam and the left and right side beams all have an L-shaped cross section.

19. The pallet support cart of claim 5, wherein a top surface of the middle beam, the left and right side beams, the front beam, and the rear beam are all on the same plane.

20. The pallet support cart of claim 5, and comprising a left middle bracket between the left end of the middle bracket and the left side beam; and a right middle bracket between the right end of the middle bracket and the right side beam.

21. A method of assembling the pallet support cart of claim 2, comprising bolting together the front cross beam to the left and right side beams, bolting the left and right front corner brackets to the front cross beam and the left and right side beams, bolting the left and right rear corner brackets to the left and right side beams and the rear beam, and not welding together any of those parts, whereby they can be unbolted and disassembled.

* * * * *